(12) United States Patent
Wefers et al.

(10) Patent No.: US 7,925,659 B2
(45) Date of Patent: Apr. 12, 2011

(54) BUSINESS PROCESS CHANGE ANALYSIS AND TEST CASE ADAPTATION BASED ON CHANGE DETECTION

(75) Inventors: Marcus Wefers, Heidelberg (DE); Stephan Daub, Walldorf (DE)

(73) Assignee: SAP AG, Walldorf (DE)

( * ) Notice: Subject to any disclaimer, the term of this patent is extended or adjusted under 35 U.S.C. 154(b) by 784 days.

(21) Appl. No.: 11/868,897

(22) Filed: Oct. 8, 2007

(65) Prior Publication Data
US 2008/0086499 A1 Apr. 10, 2008

Related U.S. Application Data

(60) Provisional application No. 60/828,764, filed on Oct. 9, 2006.

(51) Int. Cl.
*G06F 17/30* (2006.01)
(52) U.S. Cl. .................. 707/756; 707/603; 707/703
(58) Field of Classification Search .................. 707/756, 707/603, 702, 703, 999.001
See application file for complete search history.

(56) References Cited

U.S. PATENT DOCUMENTS

| | | | |
|---|---|---|---|
| 6,257,774 | B1 | 7/2001 | Stack |
| 6,601,233 | B1 | 7/2003 | Underwood |
| 6,810,494 | B2 | 10/2004 | Weinberg et al. |
| 6,907,546 | B1 | 6/2005 | Haswell et al. |
| 2002/0083213 | A1 | 6/2002 | Oberstein et al. |
| 2005/0149868 | A1 | 7/2005 | Katayama et al. |
| 2006/0010163 | A1 * | 1/2006 | Herzog et al. ............. 707/104.1 |
| 2007/0088668 | A1 | 4/2007 | Larab et al. |
| 2007/0089091 | A1 | 4/2007 | Larab et al. |

OTHER PUBLICATIONS

Notice of Allowance and Fees for U.S. Appl. No. 11/251,281, Mailed Feb. 22, 2010, 10 pages.
Non-Final Office Action for U.S. Appl. No. 11/251,281, Mailed Jan. 22, 2009, 24 pages.
International Search Report & Written Opinion mailed May 15, 2008 for International Application No. PCT/US06/40390.
Non-Final Office Action dated May 8, 2008 for U.S. Appl. No. 11/251,281.
Gamma, "Gamma InfoShuttle Data Migration Solutions for SAP", Gamma, An applimation Company; products; Copyright 2007 Gamma Enterprise Technologies, Inc.; 2 pages http://www.getgamma.com/pro_ifs.html; retrieved Mar. 20, 2008.

(Continued)

*Primary Examiner* — Cheryl Lewis
(74) *Attorney, Agent, or Firm* — Blakely Sokoloff Taylor & Zafman (57) ABSTRACT

Methods and apparatuses enable comparing a current system configuration of a test system with a previous system configuration to determine whether differences exist between the two configurations and information about the technical objects used when performing a business transaction. The comparison can be performed via configuration metadata available for both the current and previous system configurations. A comparison result is generated to indicate any differences between the two system configurations. In one embodiment, the comparison result is used to identify a parameter of a test component that is affected by the differences in system configuration. Based on the differences in system configuration, the affected parameter is adapted by a test manager. A test case is updated based on the adapted test component responsive to the detected difference. Thus, the test system can be dynamic and adaptive.

23 Claims, 7 Drawing Sheets

OTHER PUBLICATIONS

Gamma, "Gamma InfoShuttle Rapid Test", Gamma InfoShuttle Rapid Test Data Sheet; Copyright 2007 Gamma Enterprise Technologies, Inc. (Apr. 2007); 2 pages Link from http://www.getgamma.com/pro-rt.html; retrieved on Mar. 20, 2008.

Gamma, "Gamma InfoShuttle Suite", Gamma InfoShuttle Suite Data Sheet; Copyright 2007 Gamma Enterprise Technologies, Inc., (May 2007); 2 pages; link from http://www.getgamma.com/pro_ifs.html; retrieved Mar. 20, 2008.

Gamma, "Gamma InfoShuttle Test Data Management for SAP", Gamma, An Applimation Company; Copyright 2007 Gamma Enterprise Technologies, Inc.; 2 pages http://www.getgamma.com/pro_rt.html; retrieved Mar. 20, 2008.

Mercury, "Automating Performance Testing for Predicting System Behavior and Performance", Copyright 2006 Mercury Interactive Corporation WP-1083-1106; www.mercury.com.

Mercury, "Mercury Business Process Testing: Test Automation Focused on your Business", Copyright 2004 Mercury Interactive Corporation WP-1048-0105; 14 pages www.mercury.com.

Final Office Action mailed Sep. 19, 2008 for U.S. Appl. No. 11/251,281.

Final Office Action for U.S. Appl. No. 11/251,281, Mailed Jul. 24, 2009, 27 pages.

* cited by examiner

BUSINESS PROCESS CHANGE ANALYSIS AND TEST CASE ADAPTATION BASED ON CHANGE DETECTION

This application claims priority to pending Provisional Patent Application No. 60/828,764 filed on Oct. 9, 2006 and entitled "Adaptive Business Process Change Verification".

FIELD

Embodiments of the invention relate to verifying business process changes, and more particularly to business process test case system configuration comparison and adaptation.

BACKGROUND

Businesses increasingly rely on business processes to accomplish various tasks within the organization. The business software that is used to implement the business processes becomes critical to the organization. Some software (e.g., SAP business software of SAP AG of Walldorf, Germany) allows customization and modification of the business process applications. Changes to the business processes may be made frequently (e.g., weekly or even daily) in some organizations. Prior to implementing a change in the business process software, the organization would ideally verify/validate the change to ensure the change accomplishes what is desired, and does so correctly without interruption to the normal flow of the organization. However, current methods of verification of the business process changes are expensive, time-consuming, and often require tradeoffs between reliability and cost and/or time.

Currently, business software is tested in one of two ways: manually, or via record and playback/scripting. Manual testing suffers from being very time consuming and having a small scope of possible tests. The risk that an error will "make its way through" the testing is relatively high. The inefficiency and cost aspects to manual testing makes manual testing a generally unacceptable procedure. Automated tests are generally considered to improve quality, but generating and maintaining test content is traditionally time consuming and expensive.

Record and playback testing traditionally involves recording an entire sequence of activities that a particular participant in the business process would perform. However, conventional record and playback requires that the test setup be an exact system duplicate of the recording. Variations between the systems frequently fail the testing. Additionally, the testing system must be extremely stable, given that changes to the system will fail the recording. Even in systems where the test does not fail for minor system changes, there is generally a limited access for test systems to business process content. While some traditional systems may not fail the test based on the changes, there is no ability to alter the test content based on changes. Furthermore, program scripting has a significant drawback in that specific tests must traditionally be written and adapted manually for every change. All current scripting tools have proprietary components that require specialists in the tool to implement. The cost of maintenance can become significant and possibly prohibitive. Thus, record and playback/scripting requires controlled conditions that are very difficult to produce, and difficult to duplicate. The complexity increases the cost of the procedure and does not guarantee the desired outcome.

Besides direct changes to a business process, a system may be affected by system maintenance. System maintenance is generally performed via a Transport Order that may include software changes (e.g., changes to technical objects such as code, user interfaces, etc.) as well as customizing and master data changes (e.g., table entries for configuration changes and master data tables). Such changes can cause the test case to fail even though the business process executed via a transaction of the enterprise software will still perform correctly. That is, the changes may cause changes that destroy the automated test case, even though the execution in the non-test system would perform correctly.

SUMMARY

Methods and apparatuses enable comparing a current system configuration of a test system with a previous system configuration to determine whether differences exist between the two configurations. The differences in the configuration may include code changes that might have a significant effect on the business logic. The comparison can be performed via configuration metadata available for both the current and previous system configurations. A comparison result is generated to indicate any differences between the two system configurations. In one embodiment, a context of a specific implementation of the test system is identified. The context may include information related to best practices for a business process, industry or geographic standards, compliance (e.g., governmental) requirements, etc. The differences may be determined for any one or more of a test screen, a field, a class, a configuration parameter, etc.

In one embodiment, the comparison result is used to identify a parameter of a test component that is affected by the differences in system configuration. Based on the differences in system configuration, the affected parameter is adapted by a test manager. A test case is updated based on the adapted test component responsive to the detected difference. Thus, the test system can be dynamic and adaptive. The affect component may include one or more of a test screen, a field, a class, a configuration parameter, etc.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As provided herein, a test case can be composed responsive to changes in a system configuration of the underlying test system. Thus, rather than having system changes defeat or fail the test, the test content can be adapted to the system changes. Such adaptive test content enables a flexible test system that takes into account the actual system on which the testing will be performed. The test suite can identify changes with a change analysis that identifies the differences in test system configuration and changes applied to the technical objects of the enterprise software. Although the concepts of configuration and code have technical differences, the principles discussed herein apply equally well to identifying and responding to differences in code and configuration. Thus, for simplicity, "configuration" will be referred to herein, and discussion with respect to detecting changes to configuration or adapting a test case relative to configuration should be understood to apply to parameters and values representing system settings as well as technical data object information or code representing the objects. Note that performing the test system configuration changes can be performed for any of a number of reasons, including simple diagnostics or auditing of a system. In one embodiment, such results are used to provide adaptive test content. However, system configuration information can be obtained via other methods not described herein that would enable the system to adapt test content to changes in system configuration. Thus, certain implementations of change detection are described herein, but the embodiments specifically described may not necessarily represent all possible implementations. Similarly, performing a test content adaptation based on the change detection analysis may not be the only use of change detection information, although it is one use.

Figure 1:
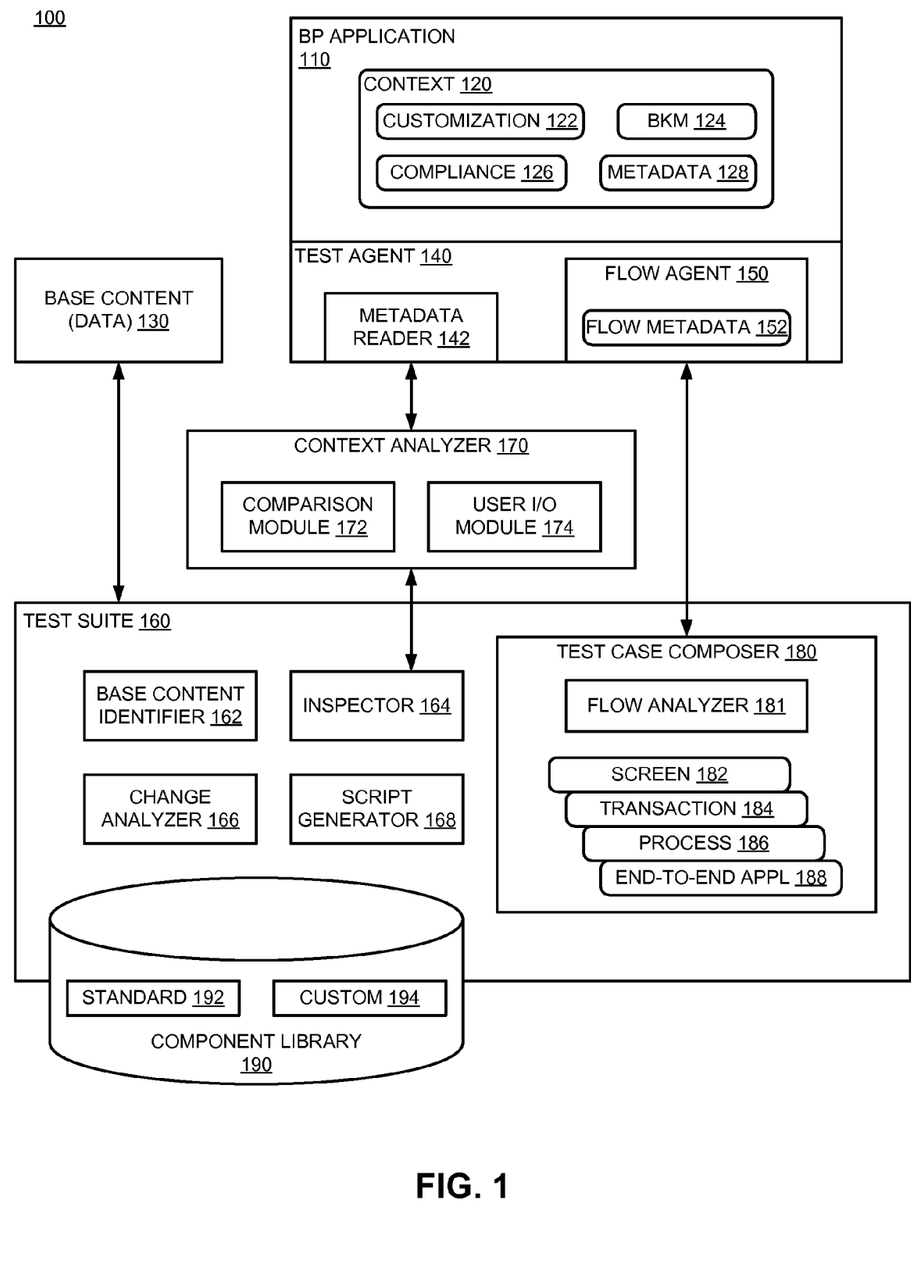
FIG. 1 is a block diagram of an embodiment of a system for generating a business process test case.

FIG. 1 is a block diagram of an embodiment of a system for generating a business process test case. System 100 represents a system within an enterprise or organization. System 100 includes business process (BP) application 110, which represents a business application or business process to be tested or verified. Application 110 executes on a system that could be referred to as a test target or a test system. Note that application 110 may be one of multiple software applications to execute on the test system. Application 110 includes context 120, which makes application 110 unique or potentially unique from other test targets or business process application, or from out-of-the-box systems. The context may be specific to a particular instance of the application, and content accessed from a backend may be instantiated on application 110 in different ways on each system. For example, context 120 may include one or more customizations 122 that have been made to a base configuration. Customization 122 has configurations that match system 100 of the enterprise, rather than being general, or matching other systems. Such customizations may be provided, for example, via configuration parameters. BKM 124 represents best known methods or best practices for application 110. BKM 124 can be broken down, for example, by industry (e.g., oil and gas industry, banking industry, car manufacturing), geographic region (e.g., Europe, North America), etc. Context 120 may also include compliance data 126. Compliance data 126 represents one or more items that provide rules of procedure with one or more standards. The standards may be internal and exclusive to the enterprise, shared among business partners, industry standards, legal standards (i.e., government standards, such as Sarbanes-Oxley provisions), security policies, etc. Metadata 128 represents any type of data within the system that indicates information about one or more of the specific context items discussed above. In one embodiment, a system configuration may maintain context metadata that can be read and interpreted by test suite 160. The system configuration can be local to an executing system, or may reside in the enterprise backend.

Application 110 is based on base content 130, which represents a previous system configuration. Such a previous system configuration can refer to an out-of-the-box, or an initial configuration version of a business process or application, or the underlying system that will execute the application. In one embodiment, tests content and/or test results are stored from one test to another. In such a case, base content 130 may represent a "previously-known-good" version or a previously tested version of a business process or application. Thus, test content for application 110 may be generated that represents a modification from a previous test of application 110. The adaptations of test content could therefore be incremental according to the changes made to application 110 over previous versions. In one embodiment, metadata 128 may represent a difference configuration, referring to information that indicates only what is different from base content 130, rather than having an entire configuration.

Application 110 further includes test agent 140. Test agent 140 includes metadata reader 142 that gathers metadata 128 from application 110. The gathered metadata can be analyzed (i.e., by test suite 160) to determine how to generate a test for the business process flow of application 110. For example, the test suite may indicate how application 110 differs from base content 130. Based on determining how the configuration differs, the system may adaptively generate test content that reflects the differences in configuration. The metadata gathered by metadata reader 142 can be analyzed by inspector 164 and change analyzer 166. In one embodiment, test agent 140 includes flow agent 150 that generates flow metadata 152, which includes information about work flows in application 110. A work flow includes one or more sequences in which work is performed, and includes data related to how systems and data of application 110 are used.

In one embodiment, test agent 140 includes flow agent 150, which represents one or more components that observe and record user behavior with respect to application 110. Flow agent 150 may observe user behavior on the subject test target for a period of time (e.g., one week), or a number of uses (e.g., five complete uses of the business process). The observed behavior may indicate what components users select (i.e., what buttons or icons are pressed or used, and in what order), what screens a user follows to complete a task (e.g., what sequence of screens or operations a user follows), etc. The observed behavior provides information that can be later used to construct a test case that mirrors actual user behavior. Flow agent 150 can generate flow metadata 152 from observation, which provides metadata regarding the flow of operations and data on application 110, and may include some analysis of the data, or organization/grouping of the data (e.g., categories of data).

Metadata reader 142 may refer to a module that can read and parse data from a UI screen description table. Such a screen description table may reside in a backend and indicate what UI components are available, what fields are in the screens, what parameters or inputs are permissible, etc. Such metadata may be read online or offline, and interpreted by the test suite. Flow agent 150 may provide additional information via online metadata gathering. Flow metadata 152 refers to information about how the system operates in runtime. As used herein, "offline" monitoring refers to monitoring that can be performed whether or not the business process application is actively executing a business process. "Online" monitoring refers to monitoring when the business process application is in an active state and a business process is loaded for execution. The business process flow can be interpreted from the change of one screen to another within the business process application, together with the input that caused the flow change. As used herein, the change of the business process from one state to another, or from one phase to another may be referred to as application flow.

Offline monitoring as performed by test agent 140 can predicatively indicate an application flow based on interpretation of the metadata descriptions. Online monitoring as performed by test agent 140 can provide an active "look" at the application by storing information from the application stack to indicate what is occurring within the application. That is, the execution instructions as well as input values or input commands will be placed on the application stack and control operation of the application. In one embodiment, the application flow can be interpreted for application-flow rules and application-flow deviations. "Application-flow rules" refer to the standard operation of the business process application with one or more business process flows. "Application-flow deviations" refer to exceptions, special cases, changes, etc., from standard operation. Together the standard operation and the deviations indicate a technical application flow, referring to the flow of the application from the command and input value level.

Test suite 160 represents a testing entity. Test suite 160 may provide test agent 140 and/or additional components for monitoring and analysis. In one embodiment, test agent 140 performs monitoring and test suite 160 provides analysis. In another implementation, test agent 140 can also provide some or all of the analysis. In one embodiment, test suite 160 includes base content 130 (i.e., in a repository of test content/data). In another embodiment, test suite 160 accesses base content 130 from where it is stored.

Test suite 160 includes multiple modules or components to generate the test content and possibly apply a test case to application 110. In one embodiment, applying the test case or testing the test target is performed by an entity external to test suite 160. Thus, test suite 160 generates the test content, which it provides to a test application tool. The following are possible components in one or more embodiments, but should be understood as only examples, and not as an exhaustive list, nor as a list of necessary components. In one embodiment, test suite 160 includes inspector 164, change analyzer 166, and script generator 168. As described above, test suite 160 receives or accesses base content 130 from which test content may be derived in addition to information from monitoring a backend interface. Base content identifier 162 enables inspector 164 and change analyzer 166 to determine what is the base content for application 110, and enables access to the base content. Base content identifier 162 may select from among multiple available copies of base content (e.g., different versions of application 110, or different base content for different test targets). To select base content, each test component has a unique identifier that matches the identity of application 110.

Inspector 164 enables test suite 160 to evaluate content based on the context of the test system. Inspector 164 may take a closer look at the content of a test case by, for example, accessing a description of a test component in metadata. Thus, specific elements or parameters of the test component. Change analyzer, as described in more detail below, enable test suite 160 to determine what differences may exist in system configuration from base content 130. The differences may be determined on a detailed level. Test case composer 180 is able to generate a test case that is responsive to the differences determined. That is, test case composer 180 may take into account the system configuration differences when generating test content.

In one embodiment, test suite 160 includes test case composer 180, which represents one or more components that enable test suite 160 to generate test content that incorporates work flow information. In some testing scenarios, test suite 160 generates one or more flows to construct an end-to-end test case, or different flows related to aspects of application 110 to be tested that are not necessarily end-to-end. Test case composer 180 may include flow analyzer 181 that receives flow metadata 152 of flow agent 150, and analyzes user behavior information from flow metadata 152 and determines how the business process or application is actually used by users. For example, patterns of use (e.g., data access, service access, etc.) can be identified from flow metadata 152 generated by flow agent 150. In one embodiment, flow agent 150 and test case composer 180 are part of a single entity of test suite 160. The analyzed information can inform test suite 160 of how application 110 is used in practice. Test case composer 180 may determine what tests are appropriate (e.g., through heuristic or analytics algorithms) for application 110 based on the analysis of flow analyzer 181.

Context analyzer 170 obtains context information for application 110 and determines from the context how to generate a test case for the business process flow. In one embodiment, context analyzer 170 is part of inspector 164 and/or change analyzer 166. Thus, context analyzer 170 may represent functional components of inspector 164 and/or change analyzer 166. Alternatively, context analyzer 170 could exist wholly, or in part, as a separate component/entity. In one embodiment, one or more functional components of context analyzer 170 are part of test agent 140. Based on the difference(s) detected by context analyzer 170, test suite 160 generates test content adapted to match the context of application 110. Context analyzer 170 includes comparison module 172, which represents one or more components through which differences are determined between application 110 and base content 130, which may work redundantly to, or in conjunction with change analyzer 166. In one embodiment, context analyzer 170 includes user I/O (input/output) module 174. User I/O module 174 can enable user interaction with the context analysis. User I/O module 174 may, for example, provide a report that a user can verify to determine whether the analysis of test suite 160 matches what is known of application 110. The user may be able to make changes to the information, as necessary. Additionally, user I/O module 174 could allow a user to input specific information that the user wants test suite 160 to consider in generating test content. Thus, test suite 160 can adapt base content 130 independent of user input, and/or may include a user in the process through user I/O module 174.

Test case composer 180 generates one or more flow scenarios, depicted by screen 182, transaction 184, process 186, and end-to-end application (appl) 188. The depicted cascading of each of these components illustrates the concept that test case composer 180 can construct one from the other. For example, multiple screens 182 may be concatenated in a sequence to generate one transaction 184. Multiple transactions 184 can be concatenated in a sequence to generate one process 186. Multiple processes 186 can be concatenated in a sequence to generate end-to-end application 188. The sequence for each grouping is derived from information produced by flow analyzer 181. Flow analyzer 181 receives and interprets flow information from other components of test suite 160, and bases the test case flow on the monitoring of application 110 (online and/or offline monitoring).

Test suite 160 includes component library 190, which represents a database or library of components that can be used to generate a test case for application 110. Component library 190 provides reusable data objects that can be instantiated in different test cases. Component library 190 includes components as part of test suite 160. Such commonly provided components are referred to as standard components 192. Additionally, standard components 192 can be modified and/or additional components added to the library of components. Such components are referred to as custom components 194. In one embodiment, one or more of the components is a drag-and-drop component that enables relatively quick generation of test content. In one embodiment, the components are modifiable. They may be modified and stored back into component library 190, or they may be modified for specific instances of the components for a test case.

With the test components and test architecture described herein, test suite 160 supports various aspects of testing that are currently handled manually. For example, test suite 160 can enables slim test system setup via triggering of professional applications to perform the slim test system setup. With the understanding of the test case, test suite 160 can provide detailed instructions regarding how to set up a test system. The detailed setup understanding is contrasted with the existing professional application setup (e.g., on SAP TDMS or Gamma InfoShuttle) that must be configured from scratch, without the benefit of the information available to test suite 160. Test suite 160 can enable a wizard to create test execution data based on information that test suite 160 gathers for "introspection" of screens and other functionality.

Additionally, test suite 160 can enable a more sophisticated analysis of a system than what is currently available. For example, an advanced analysis possible with test suite 160 includes information as to why a test case failed (e.g., which particular data input field had an incorrect value, missing user authorization, etc.) The advanced analysis renders test result analysis more efficient, which can expedite the testing procedure. Additionally, test suite 160 can provide consolidated test results. For example, a pie chart can be generated that displays how many high priority test areas resulted in how many severe errors.

Figure 2:
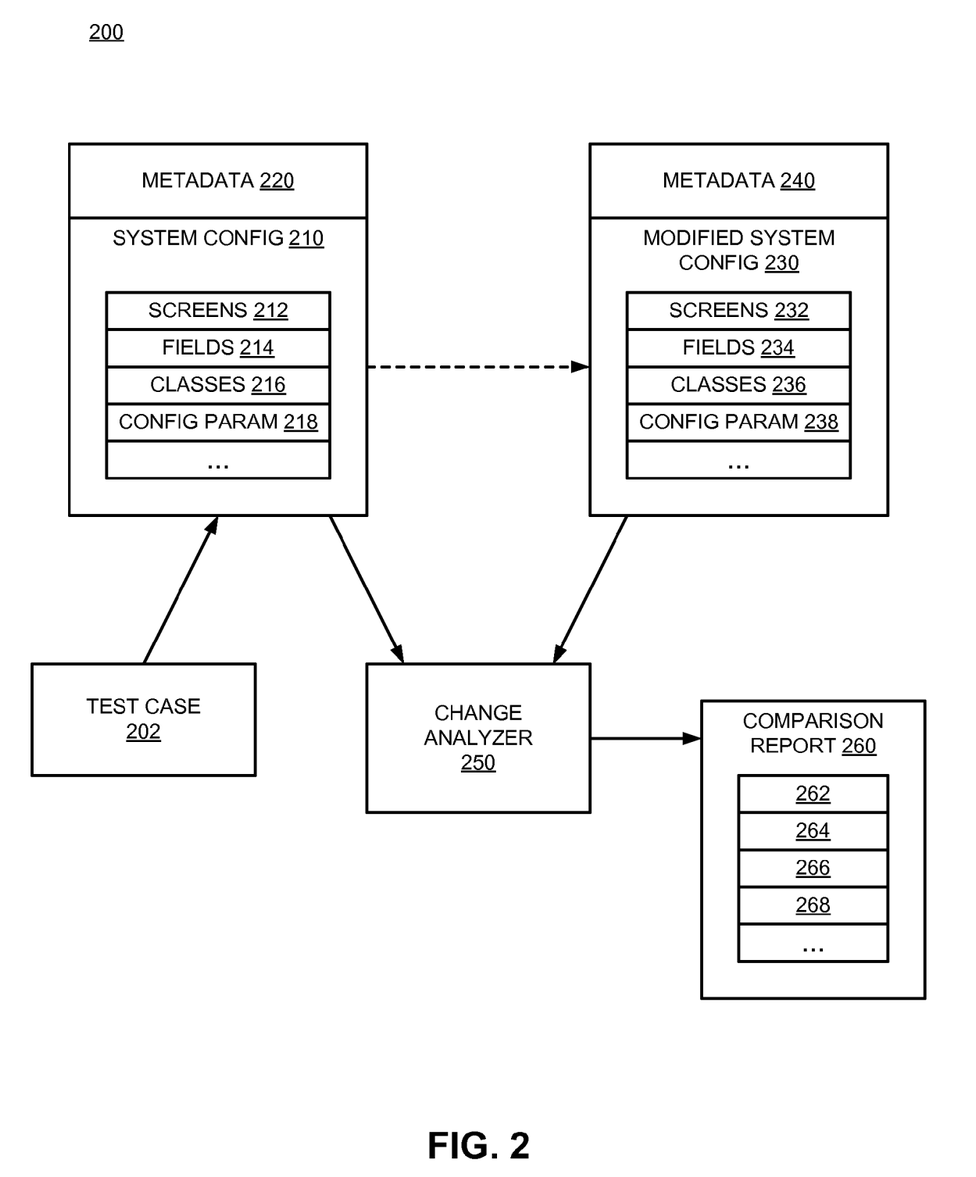
FIG. 2 is a block diagram of an embodiment of a system for analyzing changes in configuration between test systems.

FIG. 2 is a block diagram of an embodiment of a system for analyzing changes in configuration between test systems. System 200 represents a test system according to any embodiment described herein. System 200 includes test case 202, which provides one example of base content or test content related to a business process. Test case 202 is associated with a particular system configuration (config) 210. System configuration 210 may include any of a number of aspects, including screens 212, fields 214, classes 216, configuration parameters (params) 218, etc.

Screens 212 refer to UI layouts that present information to a user of the system in a particular format, with interactive fields. Certain fields may simply provide data, while others can receive input (e.g., mouse clicks, input parameters or values, selection of menus/items, etc.). One screen may transition to another screen upon selection of an item or inputting of a value. The difference in screens from one configuration to another may provide problematic for traditional test systems, which are generally unable to adapt to the change in screen content.

Fields 214 may refer, for example, to an interactive area of a screen. The name or designator of a field may be changed. The type of input required may also be modified. Classes 216 refer to object code from which specific instances of data are created. Configuration parameters 218 may include system configuration parameters, such as the system setup, physical resources, what components are installed, etc. Configuration parameters 218 can include parameters related to master data as well as, or alternatively, to test data. The master data refers to the system setup and may be the same across multiple business processes. The test data refers to the data related to a specific implementation. In one embodiment, such information is gathered through the backend inspection of the test system, as referred to above.

System 200 includes metadata 220 associated with system configuration 210. In one embodiment, metadata is attached with specific test components. Metadata 220 may additionally or alternatively be attached to the system configuration with information related to the specific components. Metadata 220 may be stored locally to the machine that will execute the business process and the test system. Metadata 220 could also be stored in a network location that is accessed by the test suite.

System configuration 210 represents what is referred to herein as base content, or a "previous" system configuration. The notion of previous system configuration refers to any past configuration to which changes are made. When the system configuration changes are made, system configuration 210 is updated to a "current" system configuration, represented by modified system configuration 230. Modified system configuration 230 could differ in any one or more test components. Thus, screens 232, fields 234, classes 236, and configuration parameters 238 correspond to similar elements of system configuration 210. The components may be based on corresponding elements of system configuration 210. Modified system configuration 230 includes related metadata 240. Metadata 240 includes information related to the various components of modified system configuration 230. Thus, comparison of metadata 240 with metadata 220 would indicate differences between screens 232, fields 234, classes 236, and configuration parameters 238 and their similar elements of system configuration 210.

In one embodiment, change analyzer 250 reads metadata 240 and 220 to determine what differences there are between system configuration 210 and modified system configuration 230. Based on the "deep" reading of the configuration information available via metadata 220 and 240, change analyzer 250 can determine what of the various elements 232-238 are affected by the changes. Thus, not only is a change detected, but affected components can be identified.

In one embodiment, change analyzer 250 generates comparison report 260. Comparison report 260 may be any type of results data, whether in table, records, list, XML (extensible markup language), or some other form, comparison report 260 includes the results of the comparison. Results 262-268 represent the differences modified system configuration 230 and system configuration 210.

Figure 3:
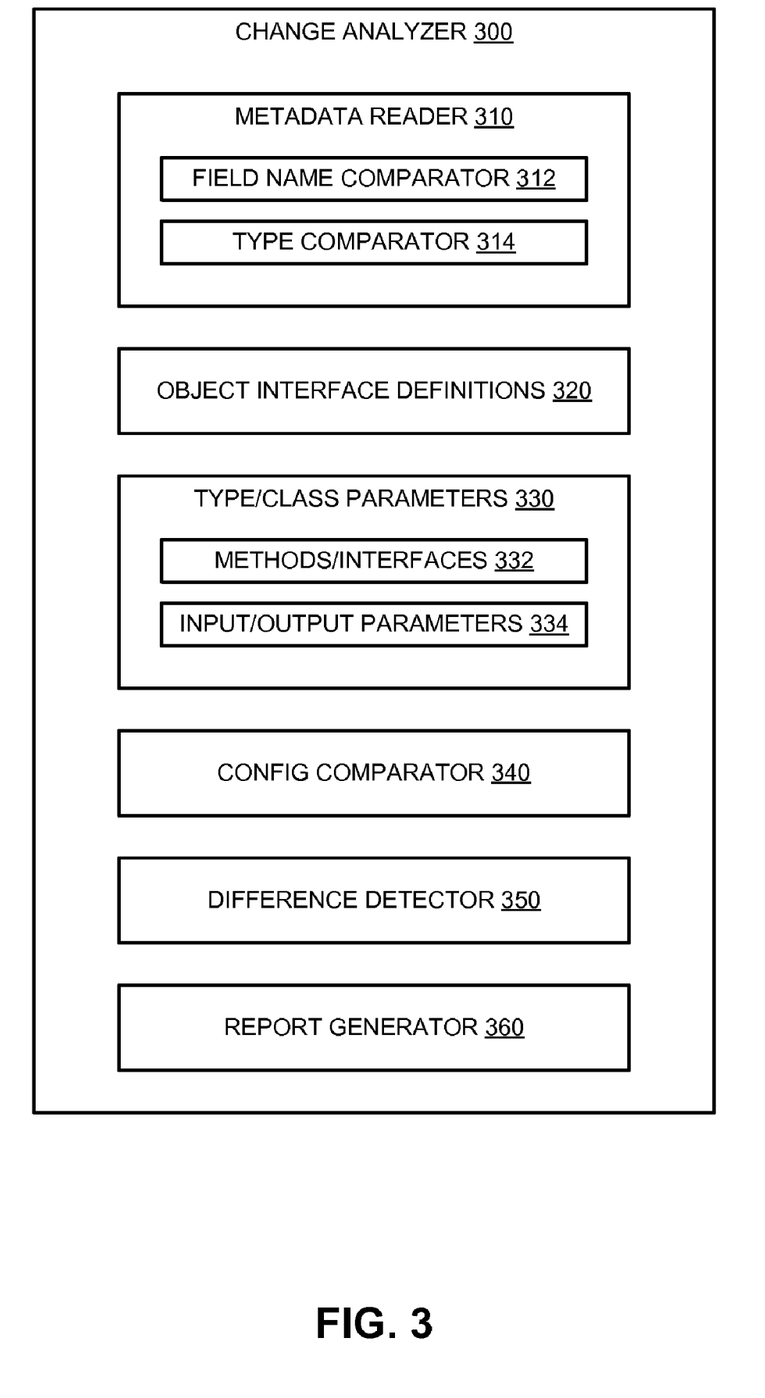
FIG. 3 is a block diagram of an embodiment of a test system change analyzer.

FIG. 3 is a block diagram of an embodiment of a test system change analyzer. Each of the elements of change analyzer 300 provides particular functionality to the analyzer. Not every element need be present in every implementation, and other elements could be included. In one embodiment, change analyzer 300 includes metadata reader 310, object interface definitions 320, type/class parameters 330, configuration comparator 340, difference detector 350, and report generator 360.

Metadata reader 310 provides the ability for change analyzer 300 to access and read metadata associated with system configurations. The metadata may be associated with particular test components, and/or with a configuration as a whole. The metadata may be stored in a single location or may be distributed across multiple locations in an enterprise, which may include the metadata spanning different backend enterprise systems. In one embodiment, metadata reader 310 includes field name comparator 312, which enables metadata reader 310 to identify and compare the field names of screens or other test case components. In one embodiment, metadata reader 310 includes type comparator 314 to identify and compare data types of various components within a test case. Type comparator 314 may indicate differences in inputs of interactive areas of a test screen. Type comparator 314 may indicate differences in underlying data or business objects associated with a field or other interactive aspect of a test component. Note that one or both of filed name comparator 312 and type comparator 314 may access or reference object interface definitions 320 and/or type/class parameters 330 in comparing one system configuration to another.

Object interface definitions 320 refer to the underlying code that defines one or more interfaces of an object. The object interfaces are used to provide access to data objects or perform a service. Type/class parameters 330 refer to any other type of object definition. In one embodiment, object interface definitions 320 is related to specific instances of data, whereas type/class parameters 330 refer to the master data definitions from which specific instances are created. Type/class parameters 330 may include methods and/or interfaces 332 of the class. Thus, how an object is invoked, or what calls can be made to an object may be included. In one embodiment, some or all of such interface and/or class parameter information can be included within system configuration metadata.

Configuration comparator 340 enables change analyzer 300 to perform a comparison of metadata elements of one set of metadata with another. Thus, change analyzer 300 can parse and compare specific aspects of the metadata associated with system configurations. Difference detector 350 represents one or more mechanisms within or associated with configuration comparator 340 that detect differences (changes) in the configurations. Difference detector 350 may represent a set of rules or other business logic that defines or identifies differences. Report generator 360 enables change analyzer 300 to generate output results that indicate the results of a configuration comparison. Report generator, as suggested above, may generate lists, tables, records, or other files or documents to indicate the differences detected.

Figure 4:
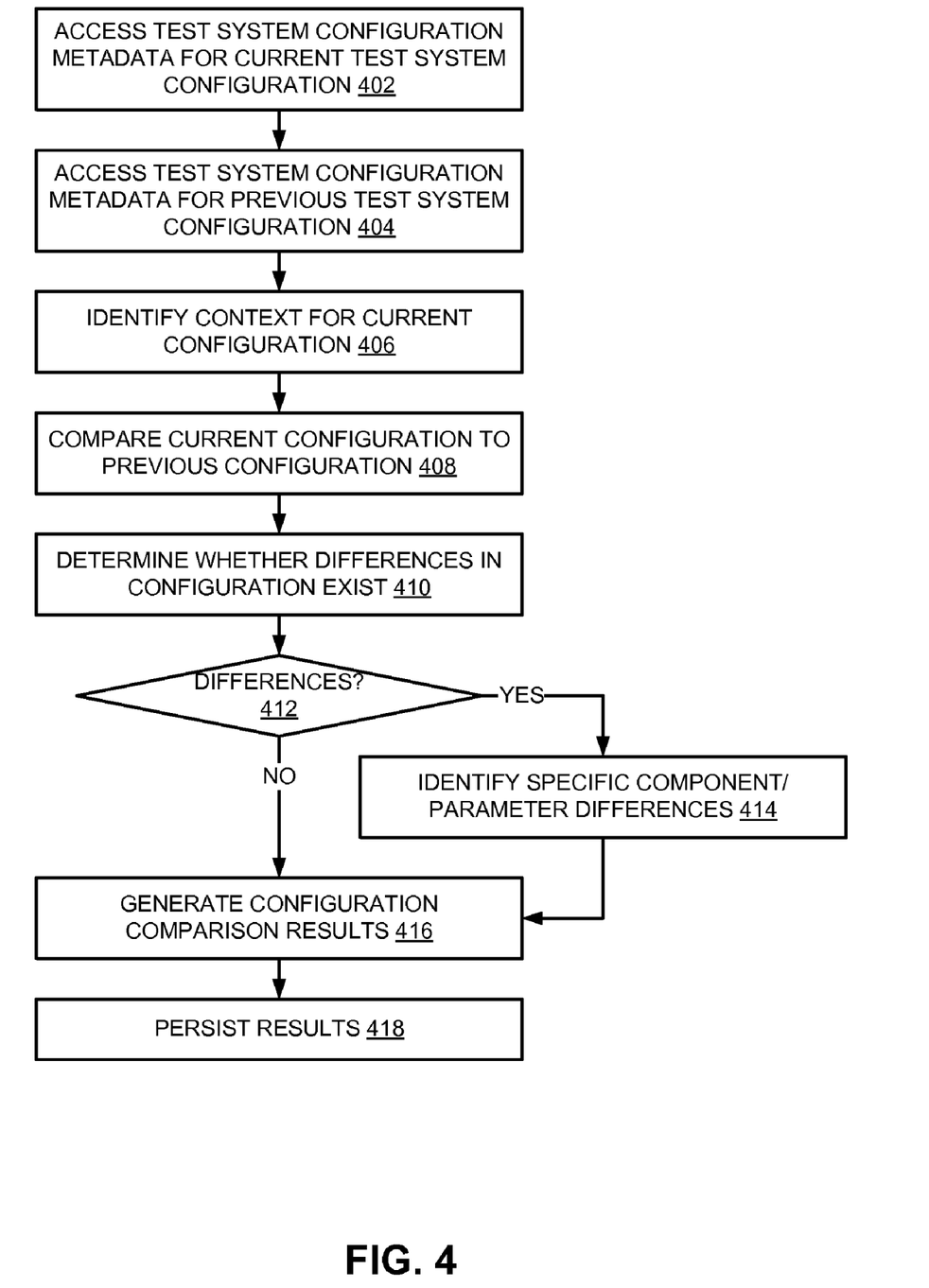
FIG. 4 is a flow diagram of an embodiment of a process for determining whether a change exists between a current test system configuration and a previous test system configuration.

FIG. 4 is a flow diagram of an embodiment of a process for determining whether a change exists between a current test system configuration and a previous test system configuration. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

A test entity such as a change analyzer or similar component of a test suite accesses test system configuration metadata for a current test system configuration, 402. The current test system configuration describes the current state of the test system, both the parameters and the code or business logic. The change analyzer accesses test system configuration metadata for previous test system configuration, 404. The previous test system configuration describes the state of the test system with respect to a previous test case, or an earlier configuration of the system. Changes to system parameters and code, business logic, and technical objects can be detected.

In one embodiment, the change analyzer optionally identifies a context for the current configuration, 406. The context identification can be performed, for example, with a metadata reader, a configuration comparator, or a difference detection component. The context of the configuration may include information related to best practices, geographic or industry standards or expectations, government regulations, or other context that may affect how a business process is configured for execution.

The change analyzer compares the current configuration to the previous configuration, 408, and determines whether differences exist between the configurations, 410. If differences exist, 412, the change analyzer may identify specific components and/or specific parameter differences between particular test components of the two configurations, 414. Thus, there is a more detailed level of comparison possible than previously possible in traditional test systems. If no differences exist, 412, or after identifying specific difference, 414, the change analyzer can generate configuration comparison results, 416. In one embodiment, the results are persisted, 418. That is, the results may be stored either locally or in an enterprise system to record the differences in system configuration. The system configuration differences can be stored for use by subsequent tests, for subsequent configuration comparisons, or as a composite record of system changes. Thus, changes can be identified by date and/or version number to indicate what configurations were being compared.

Figure 5:
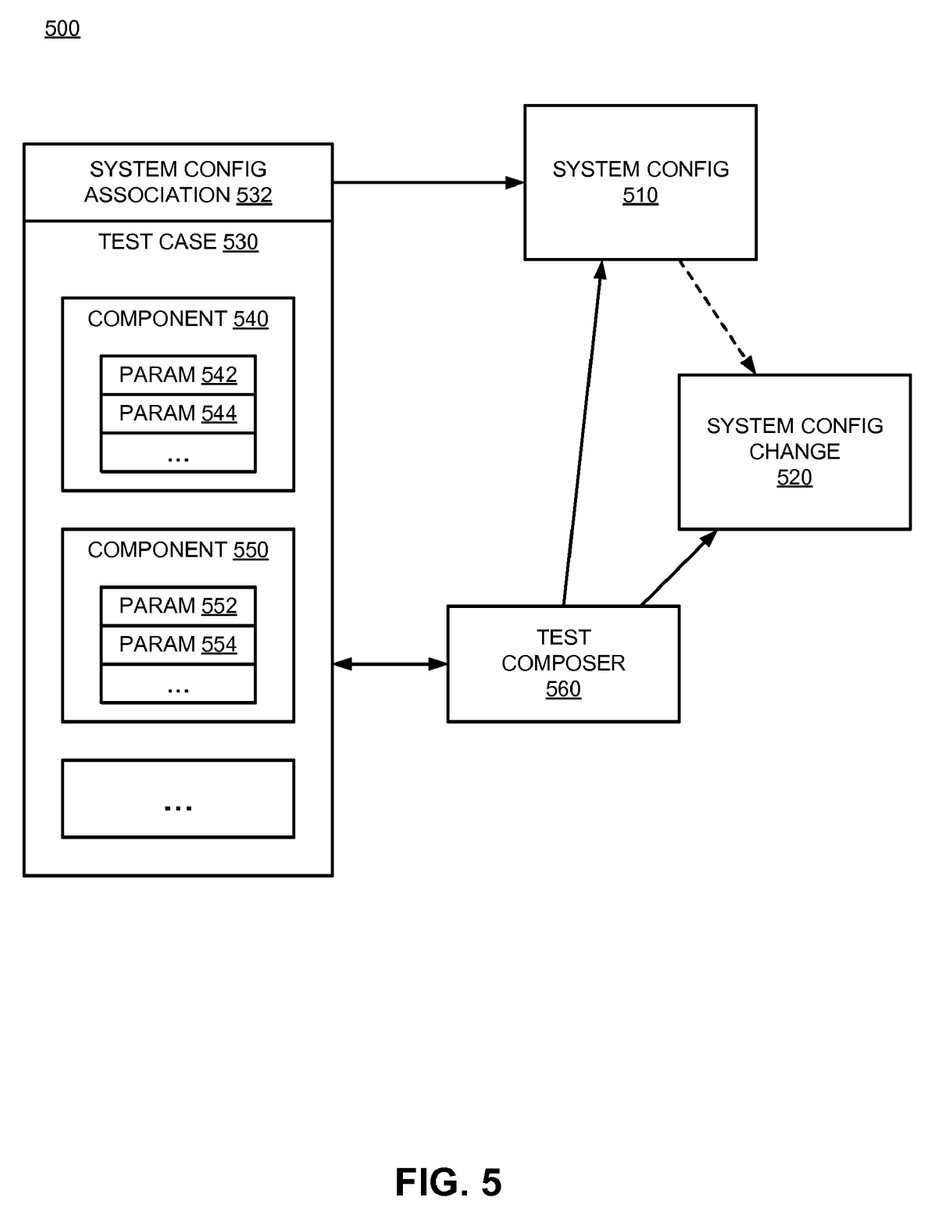
FIG. 5 is a block diagram of an embodiment of a system for adapting a test case based on a detected configuration change.

FIG. 5 is a block diagram of an embodiment of a system for adapting a test case based on a detected configuration change. System 500 includes system configuration 510, which represents a "previous" system configuration as described herein. Test case 530 represents data capable of performing an automated test of a particular business process application. Test case 530 is associated with system configuration 510, as illustrated with system configuration association 532. Such an association may refer to specific test content or test component building blocks having particular values, routines, or interfaces that are dependent upon a particular configuration of the system. Thus, changes to that configuration would impact in some way or another the test case. System configuration association 532 may not be a separate element, but an abstraction of one or more relationships or dependencies of data or methods in test case 530 on system configuration 510.

A change to system configuration 510 results in system configuration change 520. System configuration change 520 may be a relative system configuration, which refers to the configuration in terms of the differences with system configuration 510. Alternatively, system configuration change 520 may refer to a complete system configuration that has changes relative to system configuration 510.

Test case 530 includes various components, 540, 550, etc., which represent one or more test components within the test case. Component 540 includes one or more parameters, 542-544, which represent a specific implementation of component 540. Similarly, component 550 includes one or more parameters, 552-554, which represent a specific implementation of component 550. Generally, a test case includes many such components, and could include hundreds of components. Thus, the representation in FIG. 5 is intentionally simplified for clarity in description.

Test composer 560 represents one or more test suite components that enable the test suite to generate a test case (different from test case 530) and/or modify test case 530. Test composer includes a mechanism to obtain difference information that defines system configuration differences, and apply the difference information to a test case. Thus, adaptive test case content can be generated.

Figure 6:
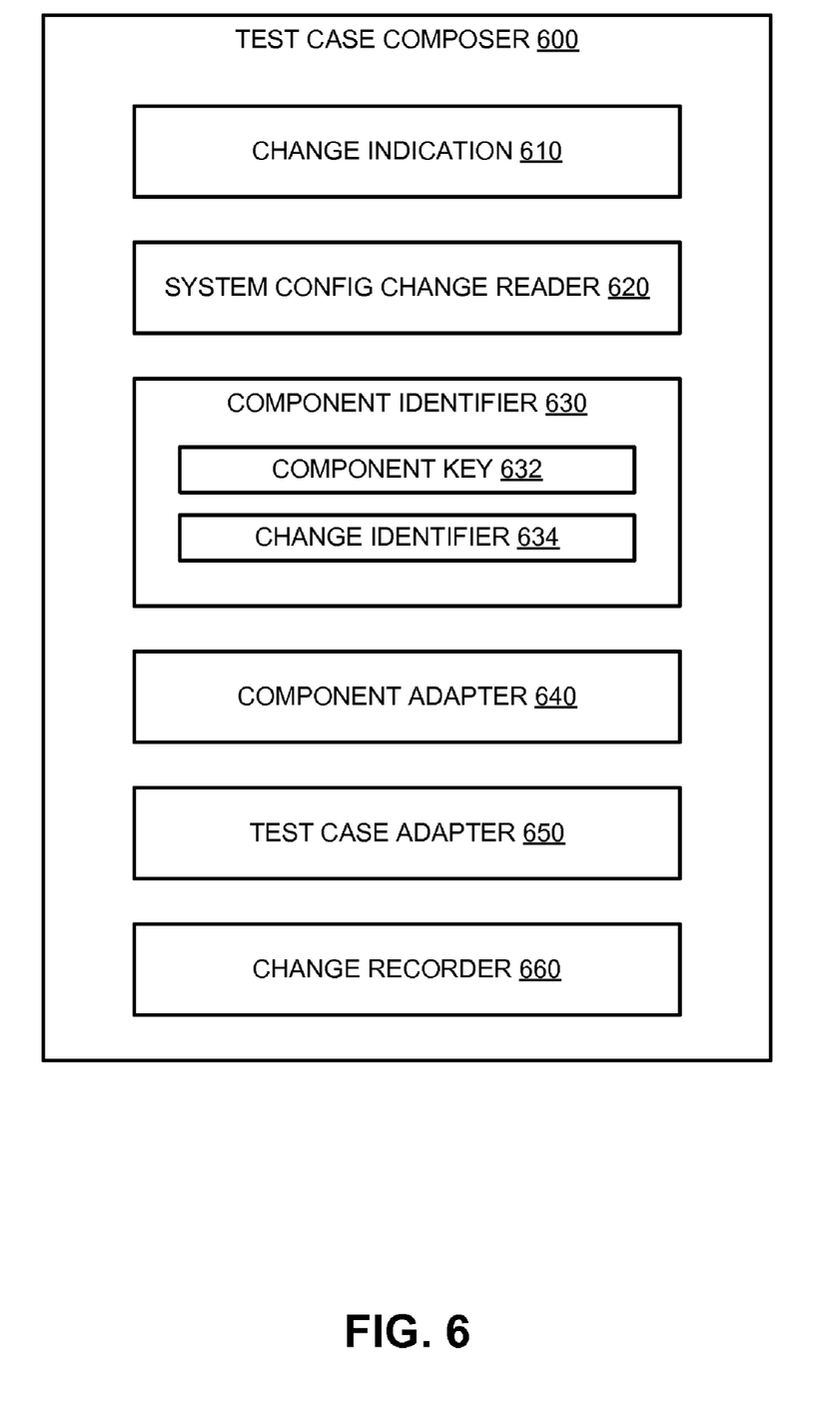
FIG. 6 is a block diagram of an embodiment of a test system test case composer.

FIG. 6 is a block diagram of an embodiment of a test system test case composer. Test case composer 600 represents one or more components of a test suite that enables the test suite to provide adaptation of test case content based on a change analysis. Test case composer 600 includes change indication module 610. In one embodiment, change indication module 610 represents interfaces with other components that provide information related to changes between system configurations. In one embodiment, test case composer 600 includes components to perform a system configuration comparison. In one embodiment, change indication module 610 refers to change indication information from a change analyzer as described herein.

System configuration change reader 620 enables test case composer 600 to perform analysis of the system configuration changes. System configuration change reader 620 includes, for example, interfaces and a parser to process the configuration change data. Analysis of the data can indicate what the changes in configuration means with respect to test content as compared to previous test content.

Component identifier 630 enables test case composer 600 to identify specific elements of the test content that are affected by changes in the system configuration. Thus, the configuration change analysis can be very specific to particular elemental changes in the system. In one embodiment, component identifier 630 includes component key 632, which provides a key, handle, or other mechanism used to access the component within the system, and change identifier 634, which provides a mechanism for the test suite to identify specific changes in the configuration. Each change may be identified by an identifier, which can then be associated with a test component change. Change identifier 634 can also be used in a record of results to indicate changes within the configurations. Specifically, change identifier 634 is used to organize or store changes, which are then applied to test content to create updated test content.

Component adapter 640 enables test case composer 600 to change one or more parameters associated with a test component (e.g., screens, fields, classes, configuration parameters, etc.). The changes to the test component can be instantiated and added to the test case via test case adapter 650. Test case adapter 650 applies the updated test component to its proper flow order to create a test case having the changes responsive to the system configuration changes. In one embodiment, the component changes are stored or persisted for subsequent use. Thus, change recorder 660 may store the changes to the test components to the enterprise system. The changes may be stored in one or more locations, in one or multiple files or documents, according to the implementation selected.

Figure 7:
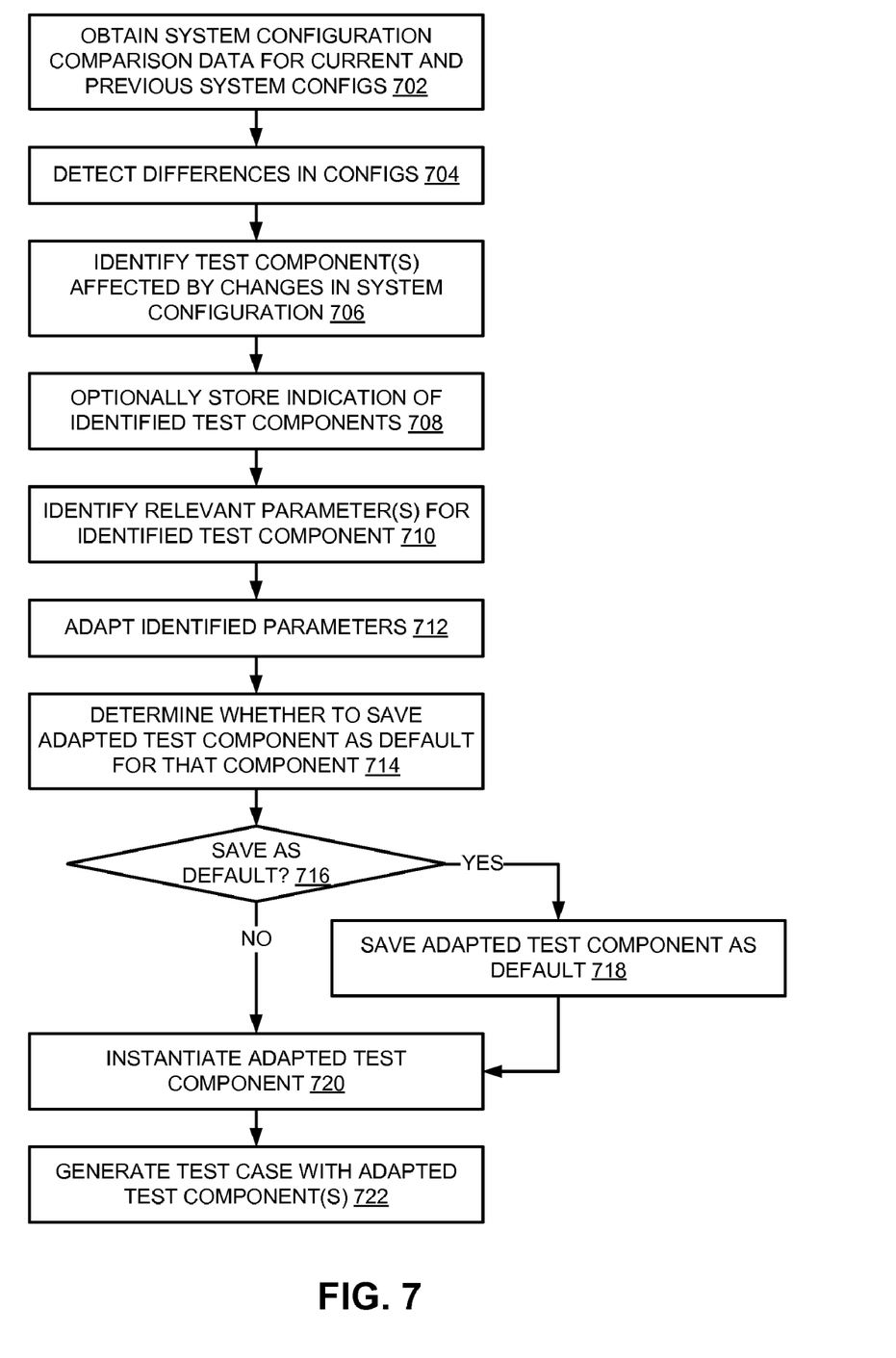
FIG. 7 is a flow diagram of an embodiment of a process for adapting a test case.

FIG. 7 is a flow diagram of an embodiment of a process for adapting a test case. A test case composer or similar/comparable test suite entity performs adaptation of a test case based on change analysis data. The test case composer obtains system configuration comparison data for current and previous system configurations, 702. The comparison data may be obtained from a change analyzer as described above, or from one or more components of the test case composer that perform a similar comparison function. Alternatively, some other component may provide comparison data. The system configuration comparison data may include parameters and system values as well as information about technical objects used in performing a business transaction.

The test case composer detects differences in the configurations based on the comparison data, 704. Detecting the differences may be as simple as reading or parsing the comparison data. Further processing may be required to determine that particular test components are affected based on system configuration changes. For example, in one embodiment, each affected system or method is identified in configuration change information. The test case composer can determine what components are dependent upon a particular system or method that is determined to be changed. The test case composer identifies one or more test component(s) affected by the changes in system configuration, 706.

The test case composer optionally stores the indication of identified test components, 708. Such stored information could be accessed for future configuration comparisons, for example. The test case composer identifies one or more relevant parameters for the identified test component, 710. The relevant parameters may be identified based on associations or dependencies indicated in metadata associated with the component.

The particular parameter identified can be changed, 712. The test component as a whole would be considered new or considered to be adapted to the current system configuration. In one embodiment, the test suite can determine whether to save the adapted test component as a default for the component, 714. That is, in some implementations, an underlying class or object code may be stored as the test component. Thus, subsequent accesses to the underlying class will be modified. In a case where the component is to be saved as a default, 716, the test suite save the adapted test component as the default, 718. In the situation where the adapted test component is not saved as the default, 716, or after saving the test component as the default, 718, the test suite can then instantiate the adapted test component, 720. The test component is instantiated as a specific implementation with the desired configuration adjustments, regardless of whether the test component is saved as a default in a modified state. The test suite can then generate a test case with the adapted test component, 722. A similar process can be repeated for each component identified as being affected by the configuration changes.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer implemented method comprising:
    obtaining system configuration metadata for a business process application, the system configuration metadata describing data elements for a current system configuration from which user interface (UI) components for the business process application are generated;
    comparing the current system configuration to a previous system configuration associated with a business process test defined in test content, the test content specific to the previous system configuration to test the UI components and to test functionality of the business process application in accordance with the previous system configuration;
    determining whether a difference exists between the current system configuration and the previous system configuration associated with the test content, based on the system configuration metadata; and
    generating a comparison report, the report indicating any differences determined between the current system configuration and the previous system configuration, to identify system configuration changes that affect an ability of the test content to test the UI components and functionality of the business process application.

2. The method of claim 1, wherein obtaining system configuration metadata for a business process application comprises:
    obtaining information about technical objects used when performing a business transaction.

3. The method of claim 1, wherein comparing the current system configuration to the previous system configuration comprises:
    comparing a specific system implementation to a default system configuration for a particular business process.

4. The method of claim 1, wherein comparing the current system configuration to the previous system configuration further comprises:
    identifying a context of a specific implementation of the system for a specific business process.

5. The method of claim 4, wherein identifying the context of the specific implementation comprises:
    identifying one or more best practices associated with the business process.

6. The method of claim 5, wherein identifying the best practices associated with the business process further comprises:
    identifying one or more of an industry to which the business process applies, or a geographic region to which the business process applies.

7. The method of claim 4, wherein identifying the context of the specific implementation comprises:
    identifying one or more compliance requirements of the business process.

8. The method of claim 1, wherein determining whether a difference exists between the current system configuration and the previous system configuration comprises:
    determining whether a difference exists for any one or more of test screens, fields, classes, or configuration parameters associated with a test case.

9. The method of claim 1, further comprising:
    persisting the configuration report for access in subsequent configuration comparisons.

10. An article of manufacture comprising a machine-readable storage medium having content stored thereon to provide instructions to cause a machine to perform operations including:
    obtaining system configuration metadata for a business process application, the system configuration metadata describing data elements for a current system configuration from which user interface (UI) components for the business process application are generated;
    comparing the current system configuration to a previous system configuration associated with a business process test defined in test content, the test content specific to the previous system configuration to test the UI components and to test functionality of the business process application in accordance with the previous system configuration;
    determining whether a difference exists between the current system configuration and the previous system configuration associated with the test content, based on the system configuration metadata; and
    generating a comparison report, the report indicating any differences determined between the current system configuration and the previous system configuration, to identify system configuration changes that affect an ability of the test content to test the UI components and functionality of the business process application.

11. The article of manufacture of claim 10, wherein the content to provide instructions for comparing the current system configuration to the previous system configuration further comprises content to provide instructions for
    identifying a context of a specific implementation of the system for a specific business process, the context including one or more of a best practice for an industry or region, or a compliance requirement.

12. A computer implemented method comprising:
    detecting a difference in a current system configuration as compared to a previous system configuration, the previous system configuration associated with a system test case composed of reusable test components aggregated to define a business process test case, the business process test case including test components specific to the previous system configuration to test a business process in accordance with the previous system configuration including user interface (UI) components and functionality for the business process;
    identifying a test component that is affected by a determined system configuration difference, which affects an ability of the business process test case to test the business process; and
    dynamically adapting a parameter of the identified test component based on the determined system configuration difference to generate an updated test component to be applied to an updated test case to test the business process in accordance with the current system configuration.

13. The method of claim 12, wherein identifying the test component comprises:
   identifying one or more of a test screen, a field, a class, or a configuration parameter associated with the business process test case.

14. The method of claim 12, wherein identifying the test component further comprises:
   generating a test report metadata to indicate test components having differences from the previous system configuration; and
   storing the test report metadata for subsequent system configuration comparison.

15. The method of claim 12, wherein dynamically adapting the parameter of the identified test component comprises:
   instantiating the identified test component with the adapted parameter.

16. The method of claim 12, wherein dynamically adapting the parameter of the identified test component further comprises:
   storing an adaptation to the parameter to change a definition of the reusable test component.

17. An article of manufacture comprising a machine-readable storage medium having content stored thereon to provide instructions to cause a machine to perform operations including:
   detecting a difference in a current system configuration as compared to a previous system configuration, the previous system configuration associated with a system test case composed of reusable test components aggregated to define a business process test case, the business process test case including test components specific to the previous system configuration to test a business process in accordance with the previous system configuration including user interface (UI) components and functionality for the business process;
   identifying a test component that is affected by a determined system configuration difference, which affects an ability of the business process test case to test the business process; and
   dynamically adapting a parameter of the identified test component based on the determined system configuration difference to generate an updated test component to be applied to an updated test case to test the business process in accordance with the current system configuration.

18. The article of manufacture of claim 17, wherein the content to provide instructions for identifying the test component comprises content to provide instructions for
   identifying one or more of a test screen, a field, a class, or a configuration parameter associated with the business process test case.

19. The article of manufacture of claim 17, wherein the content to provide instructions for dynamically adapting the parameter of the identified test component comprises content to provide instructions for
   instantiating the identified test component with the adapted parameter.

20. A test system comprising:
   change indication means for detecting a difference in a current system configuration as compared to a previous system configuration, the previous system configuration associated with a system test case composed of reusable test components aggregated to define a business process test case, the business process test case including test components specific to the previous system configuration to test a business process in accordance with the previous system configuration including user interface (UI) components and functionality for the business process;
   component identification means for identifying a test component that is affected by a determined system configuration difference, which affects an ability of the business process test case to test the business process; and
   test case adaptation means for adapting a parameter of the identified test component based on the determined system configuration difference to generate an updated test component to be applied to an updated test case to test the business process in accordance with the current system configuration.

21. The test system of claim 20, wherein the component identification means comprise:
   means for identifying one or more of a test screen, a field, a class, or a configuration parameter of the test component associated with the business process test case.

22. The test system of claim 20, wherein the change indication means further comprise:
   metadata reading means for obtaining system configuration metadata for a business process application, the system configuration metadata describing data elements for a current system configuration from which user interface (UI) components for the business process application are generated;
   comparison means for comparing the current system configuration to a previous system configuration associated with a business process test defined in test content;
   difference determining means for determining whether a difference exists between the current system configuration and the previous system configuration, based on the system configuration metadata; and
   report generation means for generating a comparison report, the report indicating any differences determined between the current system configuration and the previous system configuration.

23. The test system of claim 22, wherein the comparison means further comprise:
   means for identifying a context of a specific implementation of the system for a specific business process, the context including one or more of a best practice for an industry or region, or a compliance requirement.

* * * * *